(12) United States Patent
Barry

(10) Patent No.: US 7,150,116 B2
(45) Date of Patent: Dec. 19, 2006

(54) DEVICE AND METHOD FOR LOCATING AN UNDERGROUND OBJECT

(75) Inventor: Keith Barry, Arcola (CA)

(73) Assignee: KeiBerg International Inc., Winnipeg (CA)

( * ) Notice: Subject to any disclaimer, the term of this patent is extended or adjusted under 35 U.S.C. 154(b) by 0 days.

(21) Appl. No.: 10/896,333

(22) Filed: Jul. 22, 2004

(65) Prior Publication Data

US 2006/0016105 A1   Jan. 26, 2006

(51) Int. Cl.
*E02F 3/00* (2006.01)
*F16L 57/00* (2006.01)

(52) U.S. Cl. .......................... 37/466; 405/157; 116/209

(58) Field of Classification Search ................ 405/157; 116/209, 200, 67 R; 37/466, 348
See application file for complete search history.

(56) References Cited

U.S. PATENT DOCUMENTS

| | | | |
|---|---|---|---|
| 3,115,861 A | 12/1963 | Allen | |
| 3,282,057 A | 11/1966 | Prosser | |
| 3,327,484 A * | 6/1967 | Launder et al. | 405/157 |
| 3,339,369 A * | 9/1967 | Ryan | 405/157 |
| 3,568,626 A | 3/1971 | Southworth, Jr. | |
| 3,633,533 A * | 1/1972 | Allen et al. | 116/200 |
| 3,868,035 A * | 2/1975 | Broyles | 414/699 |
| 3,871,536 A * | 3/1975 | Brown | 414/694 |
| 3,908,582 A | 9/1975 | Evett | |
| 4,623,282 A | 11/1986 | Allen | |
| 4,654,639 A | 3/1987 | De Courville | |
| 4,949,664 A | 8/1990 | Wallace | |
| 4,988,236 A * | 1/1991 | Ramsey et al. | 405/157 |
| 5,044,303 A | 9/1991 | Culver, Jr. | |
| 5,244,715 A | 9/1993 | Kuchar | |
| 5,991,013 A * | 11/1999 | Eslambolchi et al. | 356/73.1 |
| 6,371,692 B1 | 4/2002 | Fatigati | |
| 6,527,246 B1 * | 3/2003 | Stinnett | 248/545 |
| 6,609,855 B1 | 8/2003 | Eslambolchi et al. | |
| 6,702,518 B1 | 3/2004 | Harris | |
| 6,941,890 B1 * | 9/2005 | Cristo et al. | 116/209 |

\* cited by examiner

*Primary Examiner*—Victor Batson
(74) *Attorney, Agent, or Firm*—Ryan W. Dupuis; Michael R. Williams; Adrian D. Battison

(57) ABSTRACT

An indicator device is used for locating an underground object, for example an underground pipeline, prior to surrounding excavation by a bucket excavator. The device generally comprises a panel member buried in the ground directly above the object. The panel member includes a distance marker mechanism indicating distance to a bottom end of the panel member to provide an indication to an operator of a bucket excavator. The panel member is formed in vertically stacked sections permitting individual sections to be removed sequentially as digging progresses. Each section is formed of folded tearable material which can be both unfolded to produce an elongate visible banner or torn to provide further indication to the excavator operator with regard to distance to the object to be avoided.

21 Claims, 5 Drawing Sheets

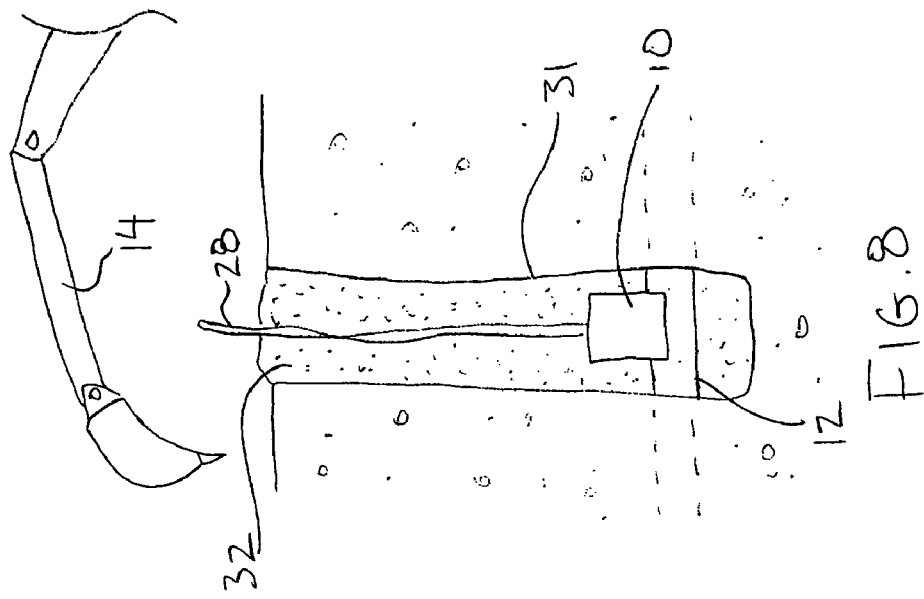
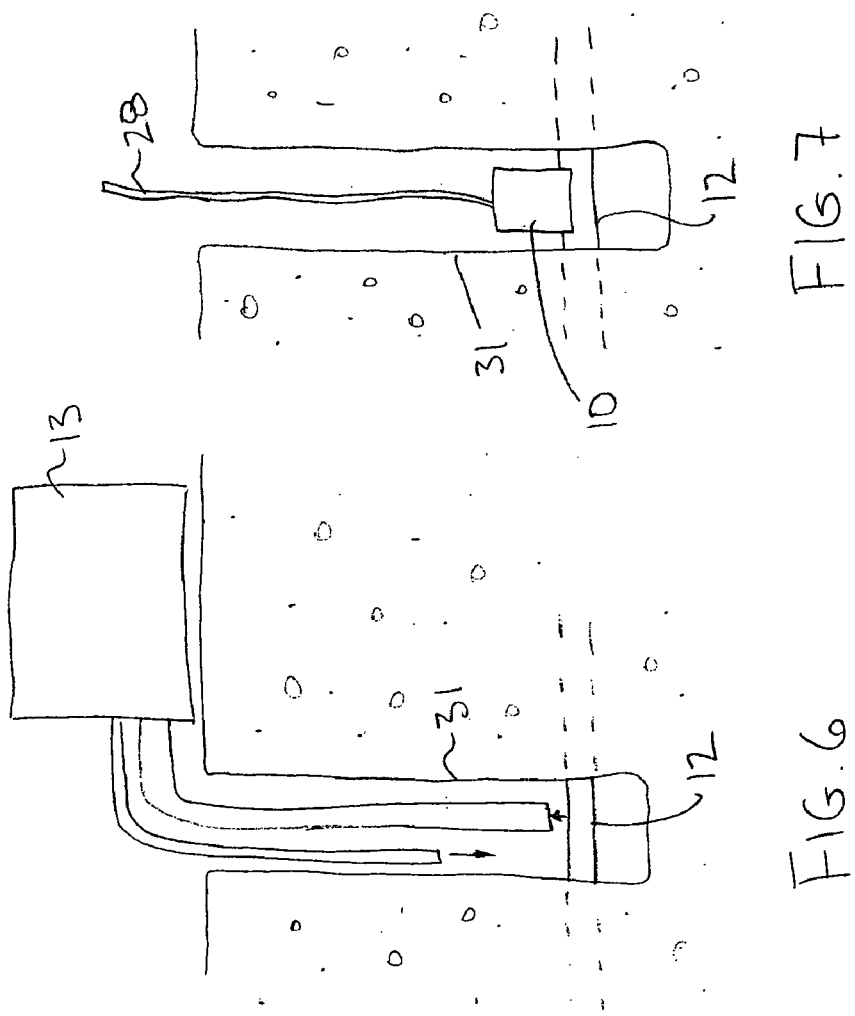

DEVICE AND METHOD FOR LOCATING AN UNDERGROUND OBJECT

FIELD OF THE INVENTION

The present invention relates to an indicator device and a method of use thereof for locating an underground object, for example an underground pipeline, prior to surrounding excavation by a bucket excavator.

BACKGROUND

Trenches for underground cables and ditches and the like are commonly dug using hydraulically actuated excavator equipment having a bucket at a free end of an arm. When such a trench is being dug across a pipeline, special care must be taken to avoid damaging the pipeline in anyway due to contact from the excavator bucket. It is common practice to initially visually locate the pipeline by providing a vacuum type excavator which uses an injector to inject liquid into the ground. The liquid forms a slurry with the earth and a vacuum mechanism on the excavator then withdraws the slurry. A small hole from the surface to the underground pipeline in the order of a few feet in diameter is thus formed. Once the pipeline is visually located, the depth of the pipeline to the surface can be measured so that a bucket excavator can proceed with a better degree of assurance as to where the pipeline is located. Presently, excavator operators use the bucket excavator to dig the trench within a prescribed safe distance of the pipeline by measuring the depth of the trench relative to the surface. While digging, it is common for backfill to cover the pipeline so the operator of the excavator loses visual contact with the pipeline while digging with the bucket. Slight measurement errors when measuring the depth of the pipeline or the depth of the trench being formed by the excavator bucket can result in extremely costly and dangerous accidents causing damage to equipment and possible loss of life due to the extremely high pressures commonly found in pipelines.

SUMMARY

According to one aspect of the present invention there is provided an indicator device for locating an underground obstacle, the indicator comprising:

a panel member for being buried in the ground in an upright orientation directly above the obstacle;

a distance marking mechanism on the panel member indicating distance to a bottom end of the panel member; and a severing mechanism on the panel member permitting portions of the panel member to be separated from a remainder of the panel member.

According to a second aspect of the present invention there is provided a method of locating an underground object prior to surrounding excavation by a bucket excavator, the method comprising:

providing a vacuum type excavator having an injector which injects liquid into the ground to form a slurry therewith and a vacuum mechanism for withdrawing the slurry;

forming a hole from a surface of the ground to the obstacle using the vacuum type excavator;

providing a panel member having a distance marking mechanism thereon indicating distance to a bottom end of the panel member and a severing mechanism permitting portions of the panel member to be separated from a remainder of the panel member;

placing the panel member in an upright orientation directly above the obstacle;

backfilling the hole about the panel member.

Location of the panel member adjacent an underground object, for instance a pipeline, assists in locating the pipeline while digging with the excavator bucket even when backfilling occurs and visual sight of the pipeline is lost. Permitting sections of the panel member to be severed from a remainder ensures that the entire panel member is not removed upon initial contact by the excavator bucket. Instead a non-contacted remainder portion of panel member remains in the ground to continue indicating the pipe location. Distance indication on the panel member, in the form of color coding, readily indicates distance to the bottom of the panel member as sections are torn or separated and removed from the trench with excavated earth.

The severing mechanism may comprise tearable material forming the panel member, forming the panel member in separate sections stacked one above the other or any combination thereof.

The sections are preferably different in color.

There may be provided a housing comprising a pair of opposed channels receiving the stacked sections spanning therebetween.

The housing preferably also includes a separating mechanism permitting portions of the housing to be separated from a remainder of the housing.

The panel member is preferably extendable in length. In the preferred embodiment, the panel member is formed of elongate sheeted material folded into segments in alternating directions in a zig-zag pattern so as to be extendable in length by unfolding the segments.

The sheeted material forming the panel member may have a length in an unfolded poison which is plural times a length of the material in a folded position.

The panel member may be formed of a paper like material having a suitable coating to resist water penetration. More particularly, the panel member may be formed of a composite material including layers of paper like material and at least one layer of a fiber mesh material.

There may be provided an elongate ribbon connected to a top end of the panel member for extending to a surface of the ground prior to backfilling about the device adjacent the object.

The panel member may include a base at a bottom end forming a cradle for alignment with a pipe.

The method may include forming the panel member in plural separated sections, one stacked above the other, to permit a portion of the panel member to be separated from a remainder of the panel member by removing one of the sections.

The method may further include forming the panel member of tearable material in order to permit portions of the panel member to be separated by tearing from a remainder of the panel member.

When the panel member is extendable between a folded position and unfolded position, the method preferably includes placing the panel member directly above the obstacle in the folded position.

The panel member is preferably oriented generally perpendicular to a longitudinal direction of a trench being formed by the bucket excavator.

BRIEF DESCRIPTION OF THE DRAWINGS

In the accompanying drawings, which illustrate an exemplary embodiment of the present invention:

FIGS. 6, 7 and 8 are partly sectional elevational views illustrating the steps of forming an initial hole from the surface to an underground object, placing the indicator device directly above the underground object and backfilling the hole prior to excavation with a bucket excavator.

DETAILED DESCRIPTION

Figure 1:
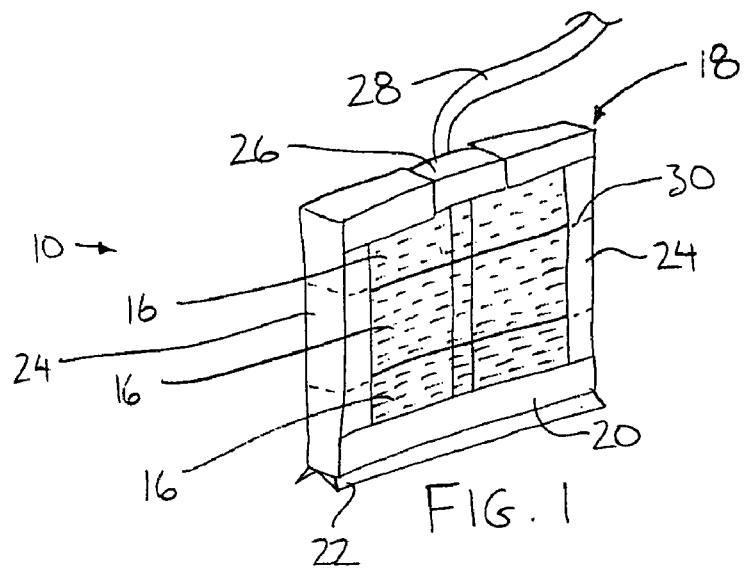
FIG. 1 is a perspective view of the assembled indicator device.
Figure 2:
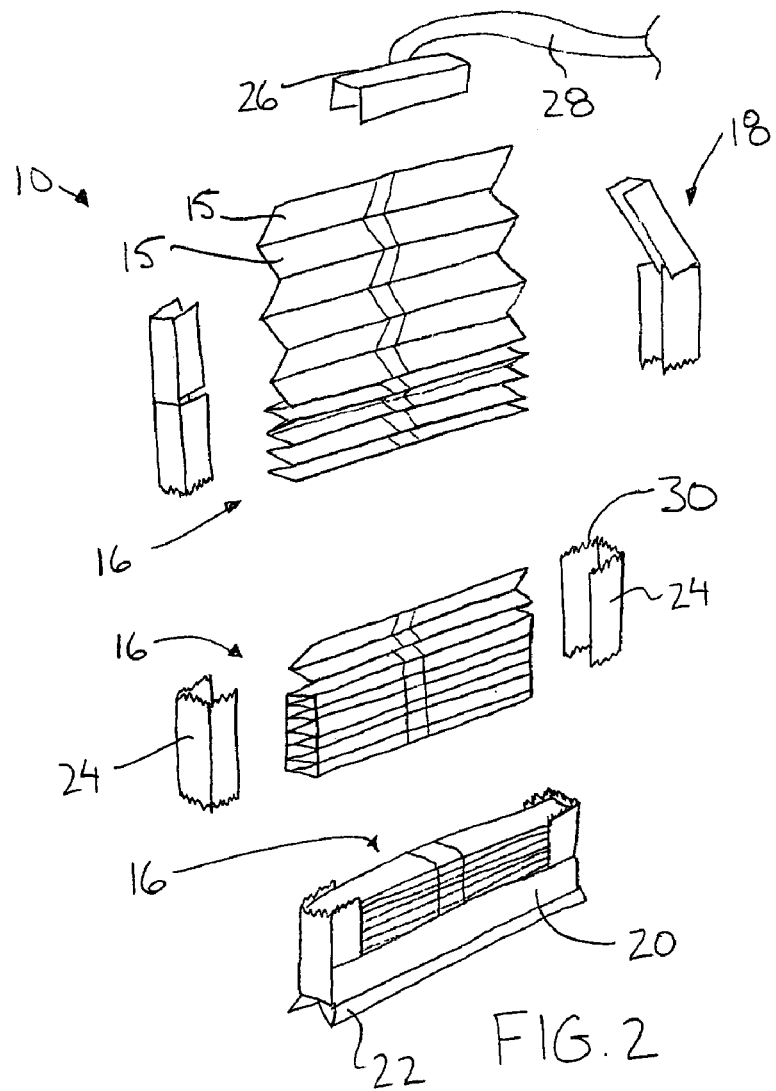
FIG. 2 is an exploded perspective view of the indicator device.
Figure 3:
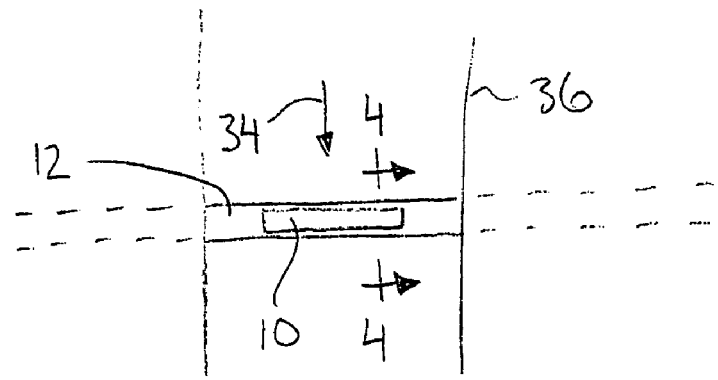
FIG. 3 is a top plan view of the indicator device above a pipeline across which a trench is being dug.
Figure 4:
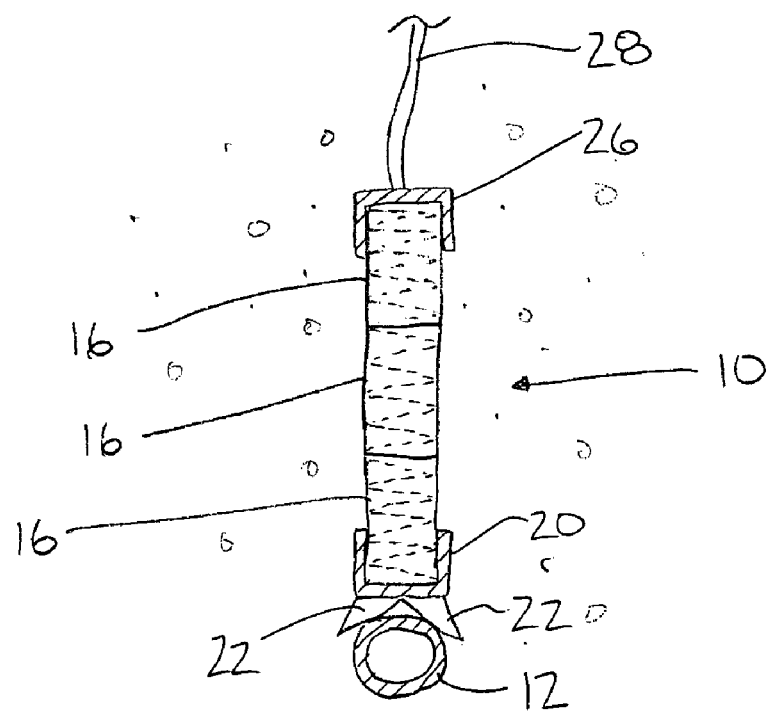
FIG. 4 is a sectional view along the line 4—4 of FIG. 3.
Figure 5:
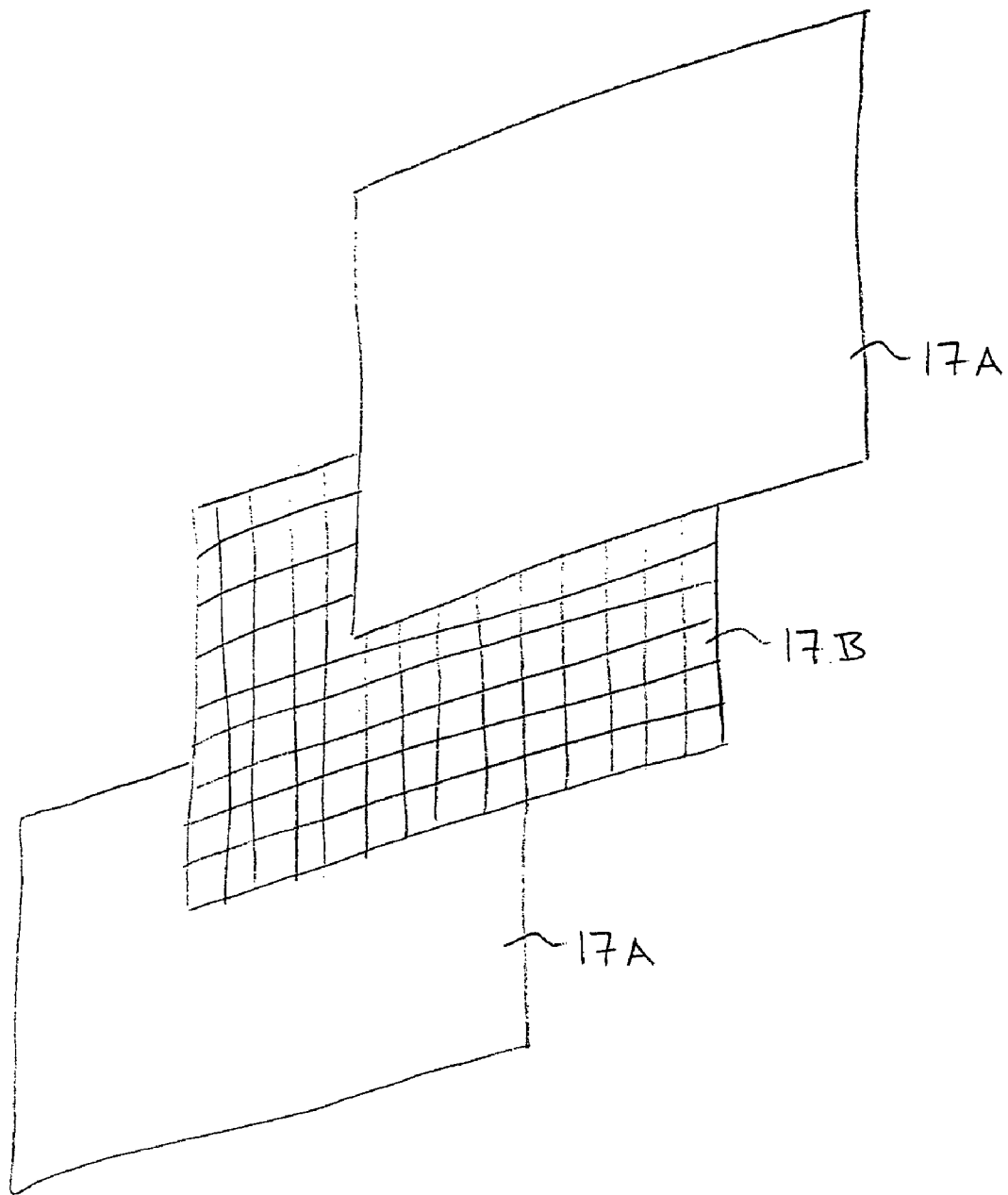
FIG. 5 is an exploded perspective view of the layers forming each section of the panel members.

Referring to the accompanying figures, there is illustrated an indicator device generally indicated by reference numeral 10. The device is particularly useful for locating an underground obstacle 12, and more particularly for locating a pipeline when digging a trench with a bucket excavator 14. The indicator device 10 is intended to be buried underground directly above the obstacle 12 to indicate distance to the obstacle once struck by the bucket excavator as the surrounding earth is being removed.

The device 10 comprises a panel member when in the assembled position illustrated in FIG. 1. Typical dimensions are approximately 3 feet tall, between 1½ and 3 feet wide and 1 inch thick. Many other sizes may still function adequately, for example a height in the range of 1 to 5 feet would remain effective. The width is available in several standard sizes including an 18 inch model, a 24 inch model and a 36 inch model.

The device is formed of plural sections 16 which are separated from one another and vertically stacked one on top of the other. In this manner the sections readily come apart when upper sections are struck by a bucket excavator so that the remaining sections stay intact directly above the obstacle for continued indication of distance to the bottom of the panel member and accordingly distance to the underground obstacle 12.

Each section 16 is of a different color to provide indication of depth to the bottom of the panel member. In the preferred embodiment illustrated herein, three sections are provided which are one foot in height each. The colors are selected to indicate increasing danger with increasing proximity to the underground obstacle or pipeline. The colors are selected so as to be identical to the familiar order of traffic stop lights in which the upper most section is green to indicate that the device has been reached but continued digging is permissible. The middle section is yellow to indicate increased caution but some continued digging is still permitted. The lower most section of the panel member is red to indicate to the operator to stop digging because the prescribed distance to the pipeline where digging should discontinue has been reached. In addition to color as an indication of distance, a vertical band is provided along the center of each section with notations thereon or other suitable indicia which indicates various degrees of severity of warning that the underground object is being approached by the excavator bucket.

Each section of the panel member is formed of a single elongate sheet in the order 1 to 3 millimeters thick. Each sheet comprises a composite material including two layers of cardboard 17A or other paper like material which has been treated by wax of some other similar coating to increase resistance to water. A third layer of a fiber mesh 17B material is received between the two first layers of cardboard material to increase the strength and durability of the material. The assembled composite forming the elongate sheet remains tearable to permit sheering or severing of portions of each section relative to the remainder. The composite forming the sheet of each section 16 is sufficiently water resistant so that the panel member may be buried in the order of six to nine months without enough degradation to prevent effective use thereof.

Each sheet forming one of the sections 16 of the panel member is in the order of one to two meters long when laying flat. The sheet is folded in alternating directions in one inch long segments 15 resulting in a zig-zag pattern permitting the sheet to be compacted in an accordion like manner to the desired height of one foot noted above in the assembled panel member. The width of each segment between the fold lines thus determines the thickness of the finished panel member. The lateral width of the unfolded sheet remains constant when the sheet is folded into the assembled panel member and thus determines the overall width of the panel member.

A suitable housing 18 surrounds the sections 16 of the panel member when stacked. The housing maintains the sections in a vertically stacked orientation one above the other. The housing 18 includes a base portion 20 which is generally U-shaped in cross section for extending along a bottom edge of the lower most section 16 of the panel member. Triangular protrusions 22 extend longitudinally along the base 20 at spaced positions to define a cradle therebetween which rests on top of the pipeline in use to assist in alignment of the panel member with the pipeline.

The housing 18 further includes two opposed side channels 24 which are similarly U-shaped in cross section and which confront one another for receiving each of the section 16 spanning therebetween. The side channels 24 thus receive opposing ends of all of the plural sections 16 by extending a full height of the stacked sections.

A suitable cap 26 extends between the opposing side channels 24 across the top end of the assembled panel member to hold the sections 16 vertically aligned within the side channels. An elongate ribbon 28 is anchored to the cap 26 and has sufficient length to extend from the buried panel member to the surface of the ground for later locating by an operator of a bucket excavator.

The housing 18 is similarly formed of cardboard like material so as to remain tearable when contacted by the bucket of the excavator. Perforations 30 are formed in the side channels 24 in alignment with an intersection between adjacent pairs of sections 16 of the panel member so that the side channels 24 are frangible into sections similarly to the sections 16 of the panel member.

When the device is buried and then subsequently contacted by an excavator bucket, portions of the panel member are severed from the remainder by either tearing segments of one of these sections from remaining segments, removing an entire section possibly by tearing the side channels 24 at the perforations, or any combination thereof. When the excavator bucket contacts one of the sections 16 of the panel member 16, the individual segments of that section may simply become unfolded resulting in a clearly visible elongate banner extending from the excavator bucket once removed from the ground.

In order to use the indicator device 10, the usual practice of visually locating the pipeline with a vacuum type excavator 13 prior to use of a bucket excavator remains in practice as illustrated in FIG. 6. Once a hole 31 is formed by the vacuum type excavator from the pipeline to the surface, the panel member of the indicator device 10 is placed directly above the pipeline in an upright orientation and the ribbon 28 is extended to the surface of the ground as shown in FIG. 7 prior to back filling with sand 32 as shown in FIG. 8.

The bucket excavator can then be safely used to excavate the surrounding earth without fear of contacting the pipeline until after the indicator device 10 has already been made visible. While digging with the bucket excavator, contact of the bucket with the panel member ensures either that a portion of the panel member will be torn away, one of the sections 16 will be removed or an upper most remaining section 16 is extended by the lifting motion of the bucket to unfold the segments of the section producing an elongate visible banner.

Figure 9:
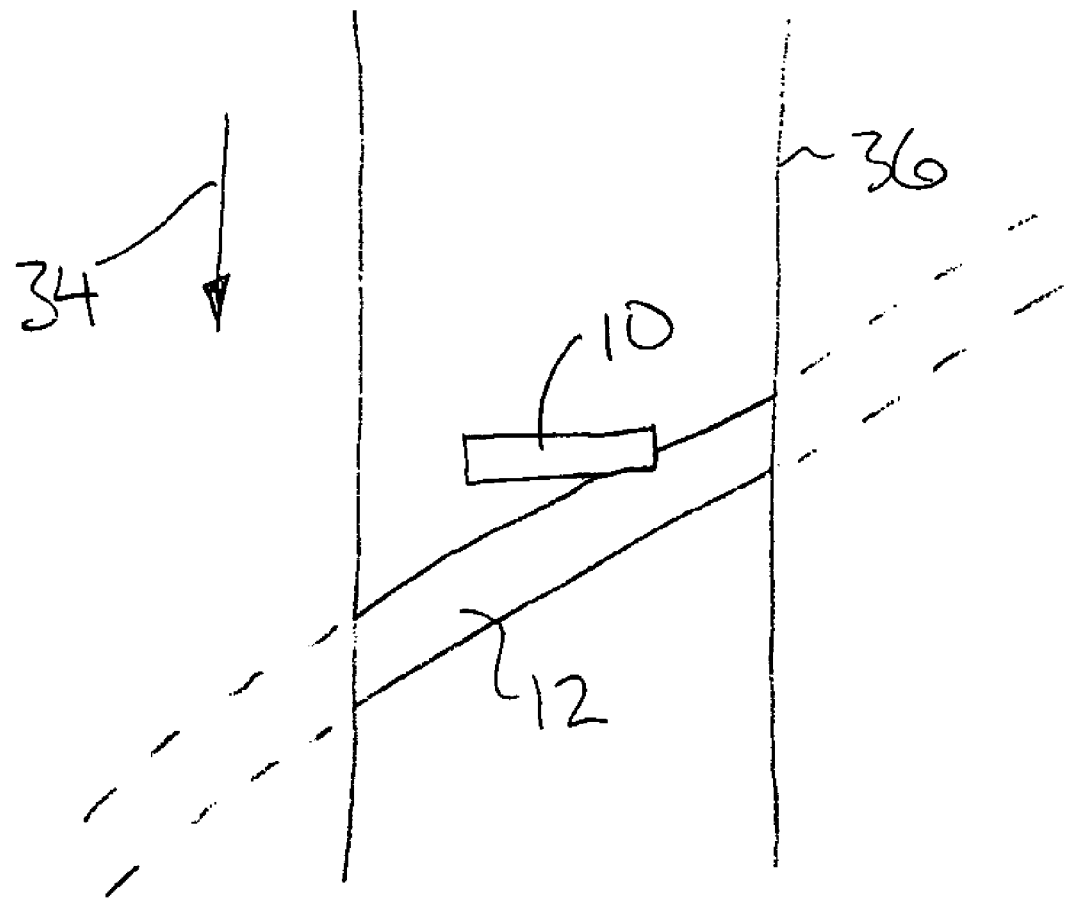
FIG. 9 is a schematic plan view of the location of the indicator device when a pipeline intersects a trench being dug.

Turing now to FIG. 9, when the underground obstacle comprises a pipeline extending at an inclination relative to the elongate direction of a trench 36 being dug, the panel member of the device 10 remains perpendicular to the longitudinal direction 34 in which the trench is being dug. The panel member is also positioned so that one end contacts the pipeline with the remainder of the panel member spanning across the trench ahead of the pipeline in relation to the direction 34 which the trench is being dug. This ensures that the panel member is contacted before the pipeline in the direction of digging while excavating with the bucket excavator.

While one embodiment of the present invention has been described in the foregoing, it is to be understood that other embodiments are possible within the scope of the invention. The invention is to be considered limited solely by the scope of the appended claims.

The invention claimed is:

1. A device for locating a buried object, the device comprising:
   material for being buried in the ground adjacent the object;
   a housing configured to surround the material during burial in the ground;
   a distance marking mechanism on the material indicating distance to one end of the material; and
   a severing mechanism permitting portions of the material to be separated from a remainder of the material.

2. The device according to claim 1 wherein the severing mechanism comprises the material being formed in separate sections stacked one above the other.

3. The device according to claim 2 wherein the distance marking mechanism comprises the sections being different in color.

4. The device according to claim 2 wherein the housing comprises a pair of opposed channels receiving the stacked sections spanning therebetween.

5. The device according to claim 2 wherein the distance marking mechanism comprises distance indicating indicia.

6. The device according to claim 2 wherein the housing surrounds the material and maintains the sections in a stacked orientation.

7. The device according to claim 1 wherein the housing includes a separating mechanism permitting portions of the housing to be separated from a remainder of the housing.

8. The device according to claim 7 wherein the separating mechanism of the housing comprises the housing being tearable.

9. The device according to claim 1 wherein the distance marking mechanism comprises distance indicating indicia.

10. The device according to claim 1 wherein the distance marking mechanism comprises sections of the material being different in color.

11. The device according to claim 1 wherein the distance marking mechanism comprises the material being formed in sections in which each section provides a different indication of distance.

12. The device according to claim 1 wherein the material is formed as a panel member.

13. The device according to claim 1 wherein the material and the housing form a unitary structure for being buried in the ground adjacent the object.

14. A device for locating a buried object, the device comprising:
    material for being buried in the ground adjacent the object;
    a housing configured to surround the material during burial in the ground;
    a distance marking mechanism on the material indicating distance to one end of the material; and
    a severing mechanism permitting portions of the material to be separated from a remainder of the material;
    wherein the material having the distance marking mechanism thereon is extendable in length.

15. The device according to claim 14 wherein the material comprises elongate sheeted material folded into segments so as to be extendable in length by unfolding the segments.

16. The device according to claim 15 wherein the elongate sheeted material is folded into segments in alternating directions in a zig-zag pattern.

17. A device for locating a buried object, the device comprising:
    material for being buried in the ground adjacent the object;
    a housing configured to surround the material during burial in the ground;
    a distance marking mechanism on the material indicating distance to one end of the material; and
    a severing mechanism permitting portions of the material having the distance marking mechanism thereon to be frangible and readily separated from a remainder of the material having the distance marking mechanism thereon such that the distance marking mechanism on the remainder of the material continues to indicate distance;
    wherein the severing mechanism comprises the material having the distance marking mechanism thereon being tearable.

18. The device according to claim 17 wherein the material comprises a paper like material having a suitable coating to resist water penetration.

19. A device for locating a buried object, the device comprising:
    material for being buried in the ground adjacent the object;
    a housing configured to surround the material during burial in the ground;
    a distance marking mechanism on the material indicating distance to one end of the material; and
    a severing mechanism permitting portions of the material having the distance marking mechanism thereon to be frangible and readily separated from a remainder of the material having the distance marking mechanism thereon such that the distance marking mechanism on the remainder of the material continues to indicate distance.

20. A device for locating a buried object, the device comprising:
   material for being buried in the ground adjacent the object;
   a distance marking mechanism on the material indicating distance to one end of the material;
   a severing mechanism permitting portions of the material to be separated from a remainder of the material; and
   an elongate ribbon connected to a top end of the material.

21. A device for locating a buried object, the device comprising:
   material for being buried in the ground adjacent the object;
   a distance marking mechanism on the material indicating distance to one end of the material;
   a severing mechanism permitting portions of the material to be separated from a remainder of the material; and
   a base at a bottom end of the material, the base forming a cradle for alignment with a pipe.

* * * * *